(12) United States Patent
Cai et al.

(10) Patent No.: US 9,048,055 B2
(45) Date of Patent: Jun. 2, 2015

(54) METHOD FOR MAKING CARBON NANOTUBE SLURRY

(75) Inventors: Qi Cai, Beijing (CN); Peng Liu, Beijing (CN); Duan-Liang Zhou, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 789 days.

(21) Appl. No.: 13/210,405

(22) Filed: Aug. 16, 2011

(65) Prior Publication Data

US 2012/0267581 A1 Oct. 25, 2012

(30) Foreign Application Priority Data

Apr. 19, 2011 (CN) .......................... 2011 1 0097648

(51) Int. Cl.
| | | |
|---|---|---|
| C01B 31/02 | (2006.01) | |
| H01B 1/04 | (2006.01) | |
| H01J 9/02 | (2006.01) | |
| B82B 3/00 | (2006.01) | |
| H01B 1/24 | (2006.01) | |

(52) U.S. Cl.
CPC ............... H01J 9/025 (2013.01); B82B 3/0009 (2013.01); H01B 1/24 (2013.01); H01B 1/04 (2013.01); H01J 2201/30469 (2013.01); Y10S 977/742 (2013.01)

(58) Field of Classification Search
CPC . H01B 1/02–1/04; B32Y 30/00; B32Y 40/00; B82B 3/0009–3/0076
USPC ................ 252/500–519.2; 423/445 B–447.2; 977/742, 845
See application file for complete search history.

(56) References Cited

U.S. PATENT DOCUMENTS

| 8,436,522 B2* | 5/2013 | Cai et al. ........................ 313/311 |
| 2006/0055074 A1 | 3/2006 | Huang et al. |
| 2007/0284987 A1 | 12/2007 | Liu et al. |
| 2009/0160799 A1* | 6/2009 | Jiang et al. .................... 345/173 |
| 2010/0041297 A1* | 2/2010 | Jiang et al. ...................... 445/24 |

(Continued)

FOREIGN PATENT DOCUMENTS

| CN | 1696054 | 11/2005 |
| CN | 101086939 | 12/2007 |

OTHER PUBLICATIONS

Cheong et al. ("Large area patterned arrays of aligned carbon nanotubes via laser trimming." Nanotechnology, 14, pp. 433-437, Published Feb. 14, 2003).*

(Continued)

*Primary Examiner* — Tri V Nguyen
(74) *Attorney, Agent, or Firm* — Novak Druce Connolly Bove + Quigg LLP

(57) ABSTRACT

A method for making carbon nanotube slurry is presented. At least one carbon nanotube film is provided, the at least one carbon nanotube film includes a plurality of carbon nanotubes oriented along substantially the same direction. A substrate is provided, and the at least one carbon nanotube film is attached to a surface of the substrate. The at least one carbon nanotube film is cut perpendicular the oriented direction of the carbon nanotubes with a laser to form a carbon nanotube belt. An inorganic binder and an organic carrier is provided, the carbon nanotube belt, the inorganic binder, and the organic carrier are mixed in an organic solvent to form a mixture. The organic solvent is removed.

13 Claims, 10 Drawing Sheets

(56) References Cited

U.S. PATENT DOCUMENTS

2010/0301278 A1* 12/2010 Hirai et al. .................... 252/502
2011/0241527 A1* 10/2011 Cai et al. ....................... 313/311

OTHER PUBLICATIONS

Lim et al. ("Laser Pruning of Carbon Nanotubes as a Route to Static and Movable Structures." Adv Mater, 15(4), pp. 300-303, online Feb. 27, 2003).*

* cited by examiner

METHOD FOR MAKING CARBON NANOTUBE SLURRY

CROSS-REFERENCE TO RELATED APPLICATIONS

This application claims all benefits accruing under 35 U.S.C. §119 from China Patent Application No. 201110097648.1, filed on Apr. 19, 2011 in the China Intellectual Property Office, disclosure of which is incorporated herein by reference. This application is related to application Ser. No. 13/210,408 entitled, "METHOD FOR MAKING CARBON NANOTUBE SLURRY", filed Aug. 16, 2011.

BACKGROUND

1. Technical Field

The present disclosure relates to a method for making carbon nanotube slurry.

2. Description of Related Art

Carbon nanotubes (CNT) are very small tube-shaped structures, and have extremely high electrical conductivity, very small diameter, and a tip-surface area near the theoretical limit. Thus, carbon nanotubes can transmit an extremely high electrical current and be used to make cathode slurry. The cathode slurry based on carbon nanotubes is usually made by the following steps: first, growing CNT; second, processing the CNT to form CNT raw material; third, dispersing the CNT raw material in organic solvents by ultrasonic vibrating and adding other fillers; fourth removing the organic solvents.

However, because the CNTs in the CNT slurry have different length, the filed emission properties of the CNT slurry will be affected. So one of the key problems is how to get the CNTs having the same length to improve the field emission properties of the CNT slurry.

What is needed, therefore, is to provide a method for making carbon nanotube slurry that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
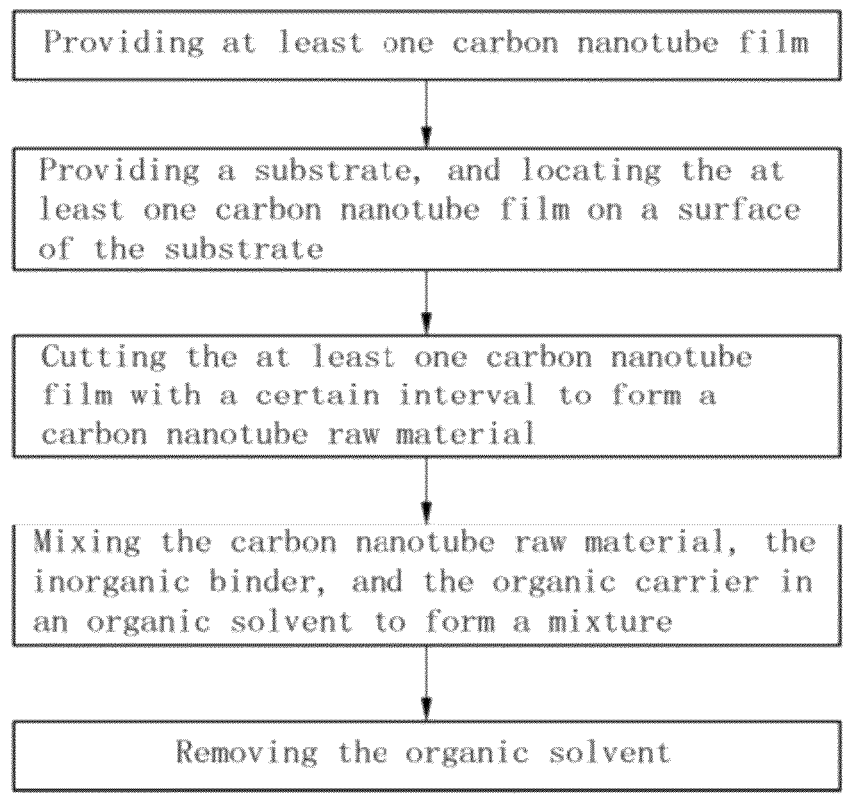
FIG. 1 is a flow chart of one embodiment of a method for making carbon nanotube slurry.
Figure 2:
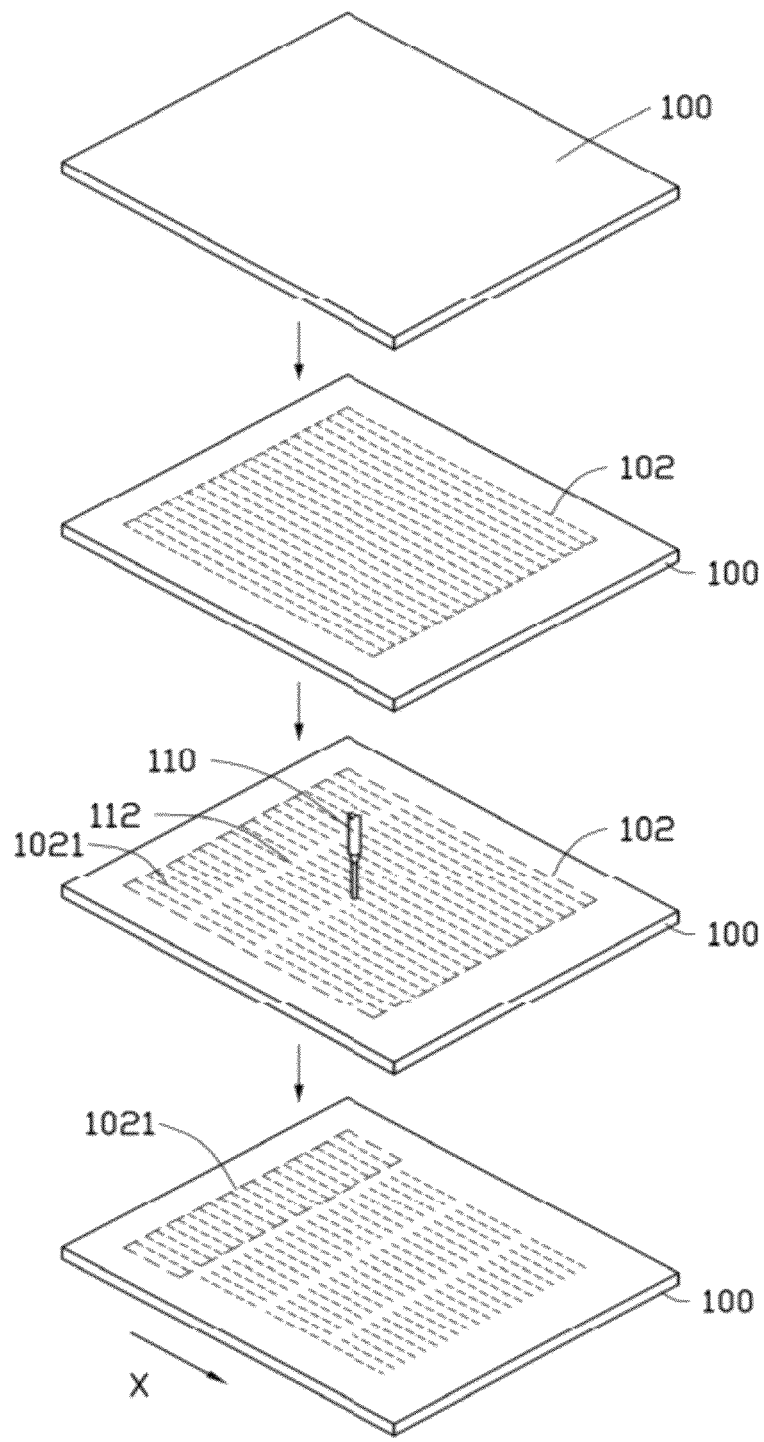
FIG. 2 is a process flow of one embodiment of a method for making a carbon nanotube raw material.

Referring to FIGS. 1 and 2, a method for making carbon nanotube slurry of one embodiment includes the following steps of:

(S10) providing a substrate 100;
(S11) applying a carbon nanotube film 102 on a surface of the substrate 100;
(S12) cutting the carbon nanotube film 102 with a laser to form a raw material, wherein the raw material includes a plurality of carbon nanotubes having substantially the same length;
(S13) mixing a inorganic binder, a the organic carrier and the raw material in an organic solvent to form a mixture; and
(S14) removing the organic solvent.

In step (S10), the material of the substrate 100 can be graphite, glass, ceramics, quartz or silica. It can be understood that the material of the substrate is not be limited to the materials cited above as long as the substrate 100 has a certain mechanical strength and a flat surface. The substrate 100 should have stable chemical properties and be able endure high temperature. The surface of the substrate 100 can be polished with physical polishing method or chemical polishing method to form a smooth and flat surface. In one embodiment, the material of the substrate 100 is quartz, and the substrate 100 has a smooth and flat surface so that the carbon nanotube film 102 can be flat attached on the surface of the substrate 100. Thus, air bubbles between the carbon nanotube film 102 and the substrate 100 can be reduced.

Figure 3:
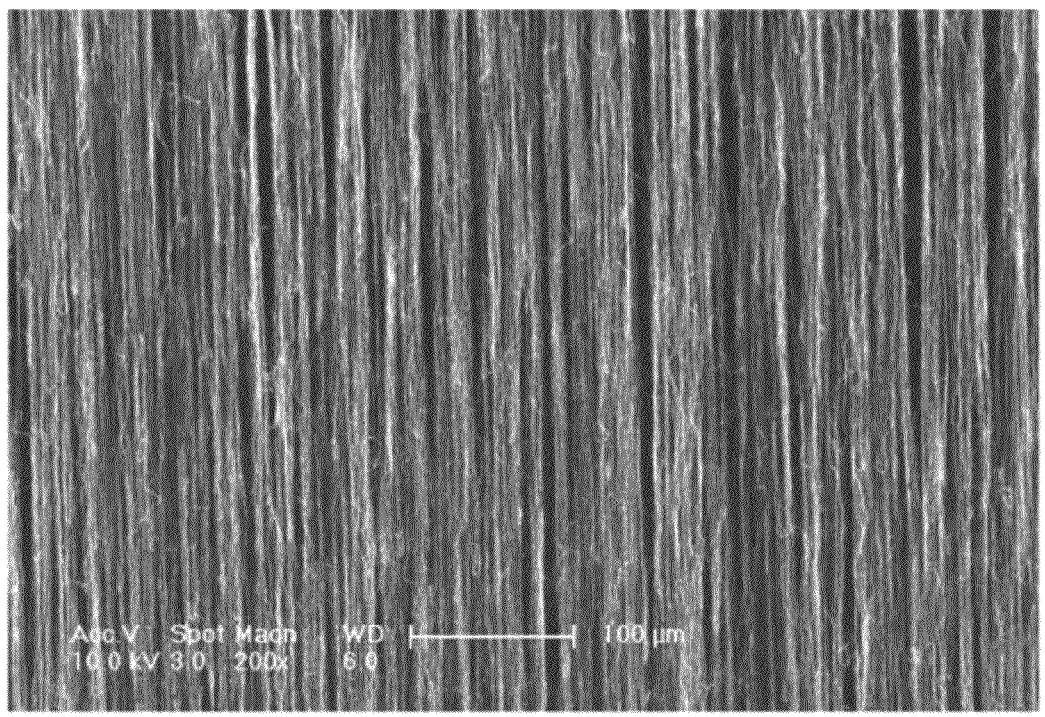
FIG. 3 shows a Scanning Electron Microscope (SEM) image of one embodiment of a carbon nanotube film.
Figure 4:
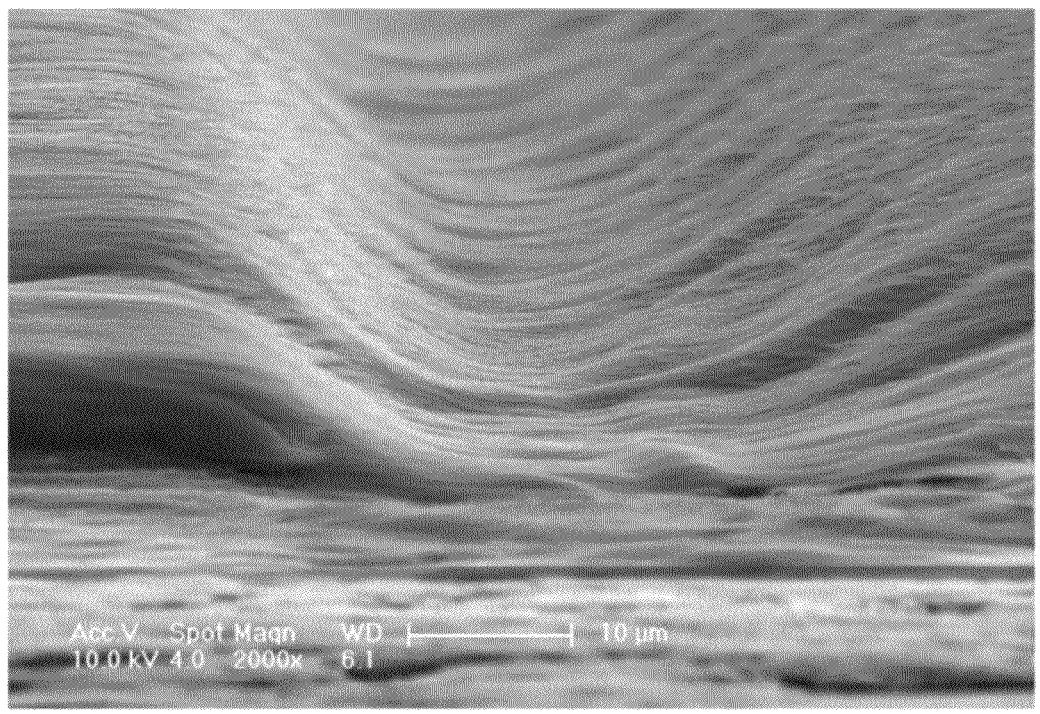
FIG. 4 shows a SEM image of one embodiment of a carbon nanotube film is cut by laser once.
Figure 5:
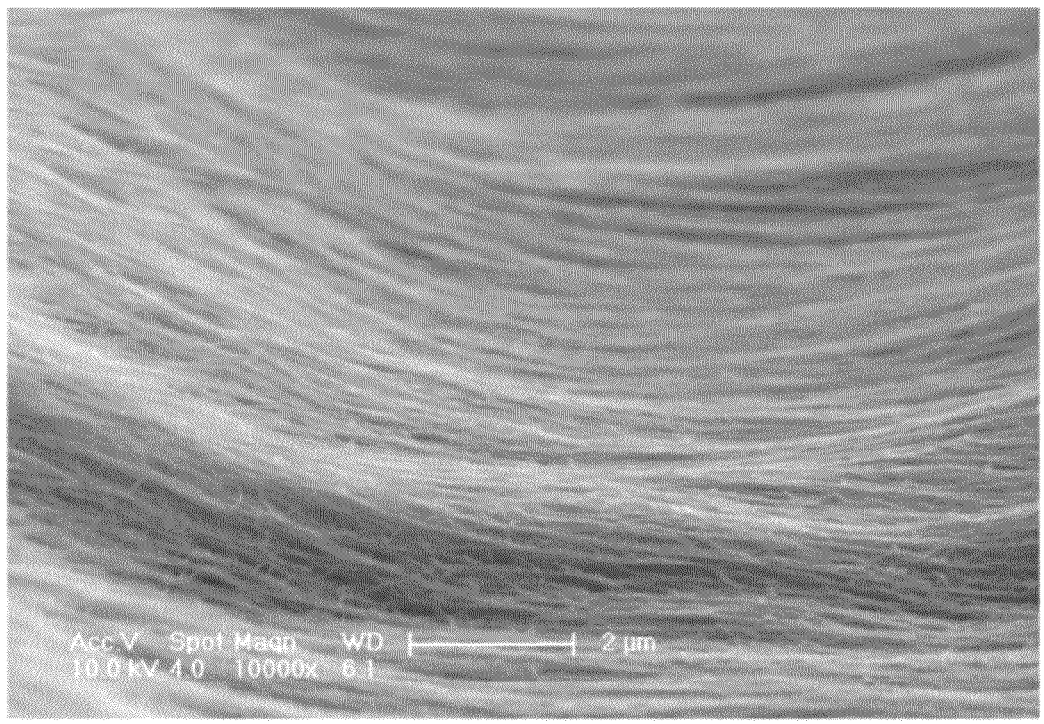
FIG. 5 shows a SEM image of magnified part of FIG. 4.

Referring to FIG. 3, in step (S11), the carbon nanotube film 102 includes a plurality of carbon nanotubes. The carbon nanotube film 102 is a continuous film. Furthermore, the carbon nanotube film 102 can be a freestanding structure. The term "free-standing structure" means that the carbon nanotube film 102 can sustain the weight of itself when it is hoisted by a portion thereof without any significant damage to its structural integrity. So, if the carbon nanotube film 102 is placed between two separate supports, a portion of the first carbon nanotube structure not in contact with the two supports would be suspended between the two supports and maintain structural integrity.

The carbon nanotube film 102 includes a plurality of carbon nanotubes distributed uniformly and attracted by van der Waals attractive force therebetween.

The carbon nanotube film 102 can be drawn from a carbon nanotube array. Examples of the drawn carbon nanotube film are taught by U.S. Pat. No. 7,045,108 to Jiang et al., and WO 2007015710 to Zhang et al. The carbon nanotube film 102 includes a plurality of carbon nanotubes arranged substantially parallel to a surface of the carbon nanotube film 102. A large majority of the carbon nanotubes in the carbon nanotube film 102 can be oriented along a preferred orientation, meaning that a large majority of the carbon nanotubes in the carbon nanotube film 102 are arranged substantially along the same direction. An end of one carbon nanotube is joined to another end of an adjacent carbon nanotube arranged substantially along the same direction by van der Waals attractive force. The carbon nanotube film 102 is capable of forming a freestanding structure. The successive carbon nanotubes joined end to end by van der Waals attractive force realizes the freestanding structure of the carbon nanotube film 102.

Some variations can occur in the orientation of the carbon nanotubes in the carbon nanotube film 102. Microscopically, the carbon nanotubes oriented substantially along the same direction may not be perfectly aligned in a straight line, and some curve portions may exist. It can be understood that a contact between some carbon nanotubes located substantially side by side and oriented along the same direction cannot be totally excluded.

More specifically, the carbon nanotube film 102 can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity, and shape. The carbon nanotubes in the carbon nanotube film 102 are also substantially oriented along a preferred orientation. A thickness of the carbon nanotube film 102 can range from about 0.5 nanometers to about 100 micrometers. A width of the carbon nanotube film 102 relates to the carbon nanotube array from which the carbon nanotube film 102 is drawn. The length of the carbon nanotubes can range from about 200 micrometers to about 300 micrometers. The carbon nanotubes can be single-walled carbon nanotubes, double-walled carbon nanotubes, or multi-walled carbon nanotubes. The diameter of the single-walled carbon nanotube can range from about 0.5 nanometers to about 50 nanometers; the diameter of the double-walled carbon nanotube can range from about 1.0 nanometer to about 50 nanometers; the diameter of the multi-walled carbon nanotube can range from about 1.5 nanometers to about 50 nanometers.

Because the carbon nanotube film 102 is a freestanding structure, the carbon nanotube film 102 can be directly attached on the surface of the substrate 100. The carbon nanotube film 102 can be secured to the surface of the substrate 100 by van der Waals force. The carbon nanotube film 102 includes a plurality of carbon nanotubes. The oriented direction of the plurality of carbon nanotubes is substantially parallel to the surface of the substrate 100.

In other embodiments, a plurality of carbon nanotube films 102 can be stacked on the surface of the substrate 100. The plurality of carbon nanotube films 102 is parallel with each other. The two adjacent carbon nanotube films 102 are attached together by van der Waals force. The oriented direction of the carbon nanotubes in two adjacent carbon nanotube films 102 are substantially the same. The number of layers of carbon nanotube films 102 can be selected according to need. In one embodiment, more than 900 layers of carbon nanotube films 102 are stacked on the substrate 100.

In one embodiment, the carbon nanotube film 102 can be treated with an organic solvent after the carbon nanotube film 102 is attached to the substrate 100. The treatment method can be executed by applying the organic solvent onto the carbon nanotube film 102 or putting the carbon nanotube film 102 into the organic solvent to soak the entire surface of the carbon nanotube film 102. During the surface treatment, the carbon nanotube film 102 is attached more firmly on the surface of the substrate 100 due to surface tension. Thus the air bubbles between the carbon nanotube film 102 and the substrate 100 are reduced. The organic solvent may be a volatilizable organic solvent, such as ethanol, methanol, acetone, dichloroethane, chloroform, or any appropriate mixture thereof.

As shown in FIG. 2, in step (S12), the carbon nanotube film 102 can be cut with a laser device 110. The laser device 110 emits a pulse laser beam. The laser device 110 can be an argon ion laser or a carbon dioxide laser. The power of the laser beam 170 can range from about 1 watt to about 100 watts. In one embodiment, the laser device 110 can have a power of approximately 12 watts.

The laser beam is irradiated on the carbon nanotube film 102, and a laser spot can be formed on the carbon nanotube film 102. The laser spot can be round in shape and have a diameter ranging from about 1 micrometer to about 5 millimeters (e.g. about 20 micrometers). It is noteworthy that the laser beam can be focused by a lens. It is also noteworthy that a number of laser devices can be adopted to adjust the shape of the laser spot. In one embodiment, the laser spot can have a strip shape having a width ranging from about 1 micrometer to about 5 millimeters.

The carbon nanotube film 102 and the laser beam are controlled to move relative to each other so the laser spot moves relative to the carbon nanotube film 102. In one embodiment, the irradiated direction of the laser beam is substantially perpendicular to the substrate 100. At the same time, the laser spot moves along a direction which perpendicular to oriented direction of the carbon nanotubes of the carbon nanotube film 102. The oriented direction of the carbon nanotubes of the carbon nanotube film 102 is defined as direction X, thus the laser spot moves substantially perpendicular to the direction X.

In one embodiment, the carbon nanotube film 102 can be fixed, and the laser device 110 can be moved to irradiate selected portions of the carbon nanotube film 102 along a scanning path. In another embodiment, the laser device 110 can be fixed, and the carbon nanotube film 102 can be moved relative to the laser beam so that some portions of the carbon nanotube film 102 on the scanning path can be irradiated by the laser beam. In one embodiment, the carbon nanotube film 102 and the laser device 110 can be fixed, and the emergence angle of the laser beam can be adjusted to cause the laser beam moving relative to the carbon nanotube film 102, so the laser spot can be projected on the selected portions of the carbon nanotube film 102.

The cutting cycles can range from 1 time to about 10 times, and the cutting speed can range from about 5 mm/sec to about 200 mm/sec. In one embodiment, the cutting speed can range from about 10 mm/sec to about 50 mm/sec. The laser power, the cutting cycles and the cutting speed can be selected according to need, as long as the carbon nanotube film 102 can be completely cut at the irradiated portions. The cutting cycles are defined as the laser beam cutting the carbon nanotube film 102 along a same scanning path for at least one time. The cutting speed is defined as the moving speed of the laser spot, which moves perpendicular to the direction X. The greater the laser power, the slower of the moving speed and the fewer number of the cutting cycles that is needed to completely cut the carbon nanotube film 102. In one embodiment, the laser device 110 is carbon dioxide laser. The laser power is about 12W, the cutting cycles are 3 times, and the cutting speed is about 50 mm/s The parameters of the laser can be selected according to need and the material of the substrate, as long as the carbon nanotube film 102 can be completely cut and the ablation to the substrate 100 can be reduced.

Referring to FIG. 2 to FIG. 5, the laser spot cuts the carbon nanotube film 102 with a certain interval along the oriented direction of the carbon nanotubes, and the moving direction is perpendicular to the oriented direction of the carbon nanotubes. In one embodiment, in the process of cutting the carbon nanotube film 102, the laser spot scans the carbon nanotube film 102 along the scanning path. The scanning path is perpendicular to the direction X. During scanning, a plurality of carbon nanotubes on the scanning path will be burn down. After scanning several times, the carbon nanotube film 102 at the scanning path is cut to form a scanning line 112. Then the carbon nanotube film 102 is scanned again with the certain interval from the scanning line 112 to form another scanning line 112, so a plurality of scanning lines 112 is formed on the carbon nanotube film 102. The distance between the adjacent two scanning lines 112 is substantially the same, so the carbon nanotubes between the adjacent two scanning lines 112 are substantially the same. The carbon nanotubes can be used as the raw material. The distance can be selected according to the need of the carbon nanotube slurry. The distance can range from about 5 micrometers to about 30 micrometers. In some embodiment, the distance ranges from about 10 micrometers to about 20 micrometers.

Furthermore, during the process of cutting the carbon nanotube film 102, a carbon nanotube belt 1021 is formed between each of the adjacent two scanning lines 112. The carbon nanotube belts 1021 have a substantially uniform width. The width of the carbon nanotube belt 1021 is the same as the distance between the adjacent two scanning lines 112. In each carbon nanotube belt 1021, the carbon nanotubes have substantially the same length. Some variations can occur in the carbon nanotube belt 1021, and the carbon nanotubes in the carbon nanotube belt 1021 may not have perfectly same length. Microscopically, some two or more adjacent carbon nanotubes are still joined end to end in each carbon nanotube belt 1021 after the carbon nanotube film 102 being cut, but the total length of the joined carbon nanotubes are substantially equal to the width of the carbon nanotube belt 1021. It can be understood that the joined carbon nanotubes cannot be totally excluded, but because they are not easily taken apart, they are also act as "one carbon nanotube". The carbon nanotubes are substantially parallel with each other. The length difference of any two carbon nanotubes is less than 5 micrometers, means that the length difference between the longest carbon nanotubes and the shortest carbon nanotubes is smaller than 5 micrometers. In one embodiment, the length difference is less than 2 micrometers. Microscopically, the carbon nanotubes oriented substantially parallel with each other may not be perfectly aligned in a straight line, and some curve portions may exist. It can be understood that a contact between some carbon nanotubes located substantially side by side and oriented along the same direction cannot be totally excluded.

Figure 6:
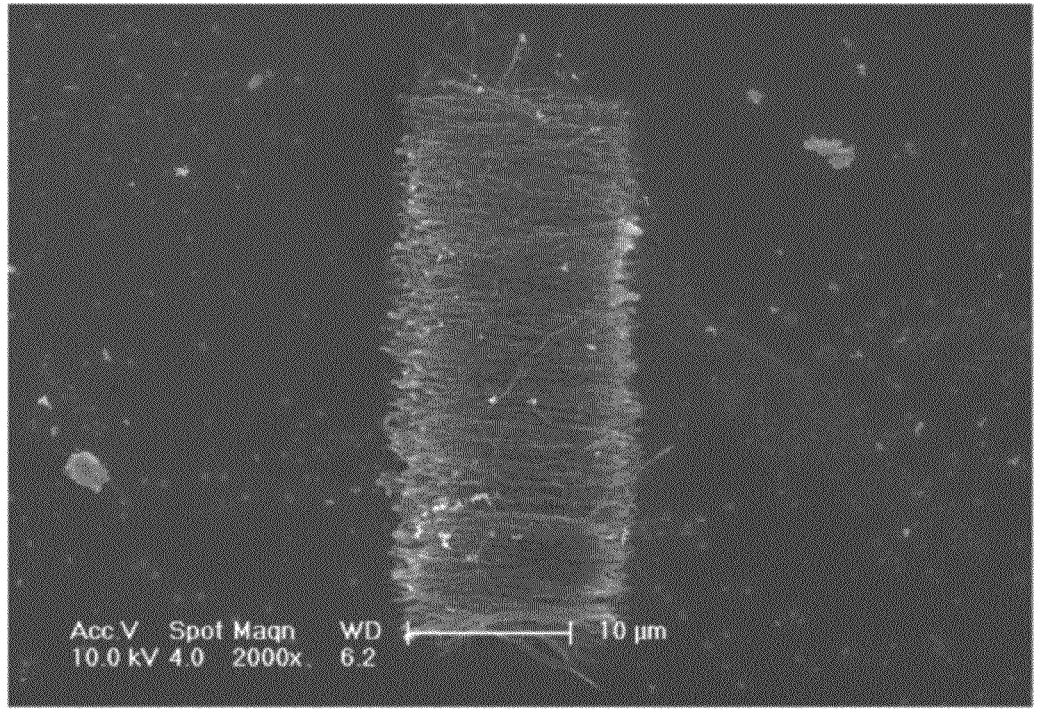
FIG. 6 shows a SEM image of one embodiment of a carbon nanotube raw material.
Figure 7:
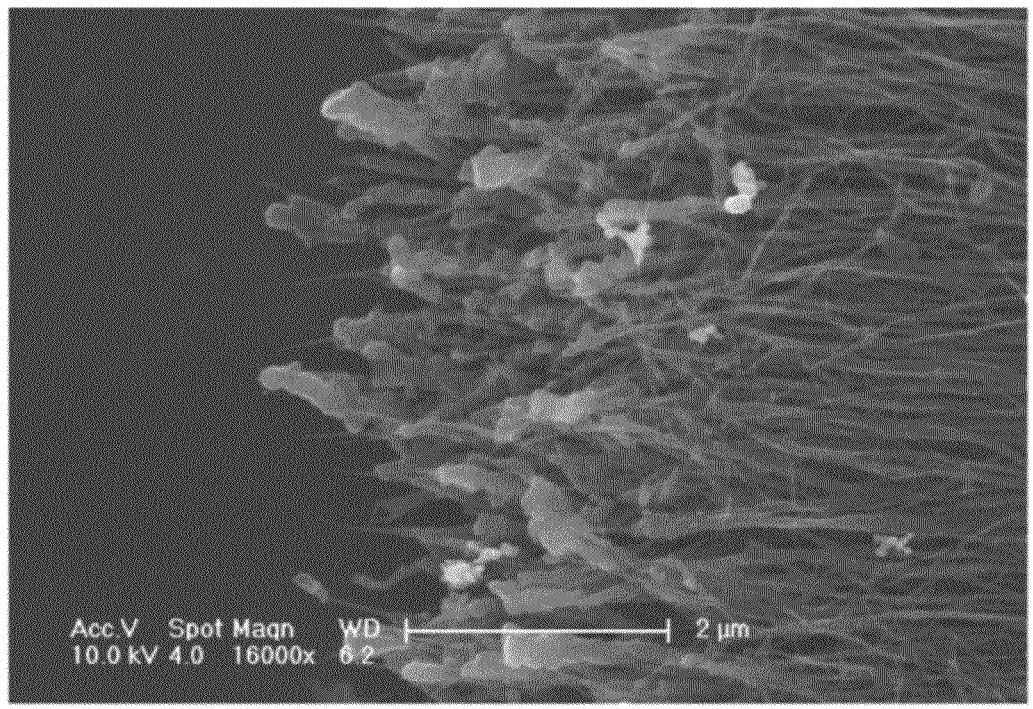
FIG. 7 shows a SEM image of magnified part of FIG. 6.

Referring to FIG. 6 and FIG. 7, the length of the carbon nanotubes can range from about 5 micrometers to about 30 micrometers according to the distance between adjacent two scanning lines 112. In one embodiment, the length of the carbon nanotubes ranges from about 10 micrometers to about 20 micrometers. When the carbon nanotubes are used as the carbon nanotube raw material, the carbon nanotubes are stacked together due to the plurality of carbon nanotube film 102 being stacked together. The carbon nanotubes are attracted by van der Waals force. In one embodiment, the length of the carbon nanotube is about 12 micrometers and the length difference between each two carbon nanotubes is less than 2 micrometers.

In step (S13), the carbon nanotube raw material, the inorganic binder, and the organic carrier can be mixed to form a mixture in an organic solvent in a container. Furthermore, filler can be added to the mixture. The weight percentage of the carbon nanotubes can range from about 2% to about 5%. The weight percentage of the inorganic binder can range from about 2% to about 5%. The weight percentage of the filler can range from about 3% to about 6%. The weight percentage of the organic carrier can range from about 84% to about 93%. In one embodiment, the weight percentage of the carbon nanotubes can range from about 2.5% to about 3%. The weight percentage of the inorganic binder can range from about 2.5% to about 4%. The weight percentage of the filler can range from about 3% to about 5%. The weight percentage of the organic carrier can range from about 88% to about 92%. In other embodiments, the weight percentage of the carbon nanotubes is about 2.5%. The weight percentage of the inorganic binder is about 3.5%. The weight percentage of the filler is about 5%. The weight percentage of the organic carrier is about 89%.

The carbon nanotube raw material, the inorganic binder, and the organic carrier can be mixed by following steps:

(S131) removing the carbon nanotubes from the substrate 110 to form the carbon nanotube raw material;

(S132) providing an organic solvent, and dispersing the carbon nanotube raw material into the organic solvent to form a first mixture;

(S133) providing an inorganic carrier, and dispersing the inorganic carrier into the organic solvent to form a second mixture; and (S134) providing an organic carrier, and mixing the first mixture, the second mixture and the organic carrier to form a third mixture.

In step (S131), the carbon nanotubes can be removed from the substrate 100 by ultrasonic vibrating. The carbon nanotubes can also be scraped from the substrate 100 by use of hard materials such as blade, glass or polyfluortetraethylene. In one embodiment, the hard material is polyfluortetraethylene because the polyfluortetraethylene is stable and smooth, thus the attachment of carbon nanotubes on the polyfluortetraethylene is avoided, and the contamination of the carbon nanotube raw material is reduced. In one embodiment, the carbon nanotubes are scraped from the substrate 100 using a glass.

In step (S132), the organic solvent can be absolute ethanol. The raw material can be uniformly dispersed into the organic solvent by ultrasonic vibrating.

In step (S133), the inorganic binder can be glass powder with low melting point. Furthermore, a plurality of fillers can be added into the second mixture, the fillers can be semiconductive particles or conductive particles. The semiconductive particles can be $SiO_2$ or $SnO_2$. The conductive particles can be metal, alloy, conductive composite material. The metal can be selected from Ag, Cu, Al and Au; the alloy can be copper and tin; the conductive composite material can be ITO. The semiconductive and conductive particles can improve the conductivity and thermal conductivity of the carbon nanotube slurry. Thus the carbon nanotube slurry can reduce the temperature, power consumption and operating current when it is used in emitting electrons. The filler can be Ag particles with a diameter ranging from about 100 nanometers to about 200 nanometers. The Ag particles can increase the conductivity between the carbon nanotube slurry and the electrode, thereby reducing the emitter temperature, power consumption and operating current.

In one embodiment, the inorganic binder is lead-free glass powder with low melting point. The melting point ranges from about 350° C. to about 600° C. The diameter of the glass powder can range from about 2 micrometers to about 10 micrometers. The role of lead-free glass powder as described above will bind the carbon nanotube raw material with the electrode to form a good electrical contact. Furthermore, because the lead-free glass powder does not contain PbO, it can reduce the risk of the oxidization of the carbon nanotubes in the subsequent sintering process.

In step (S134), the organic carrier is a volatilizable organic material and can be removed by heating. The organic carrier can include a diluent, stabilizer, and plasticizer. The diluent can dissolve the stabilizer and allows the carbon nanotube cathode slurry to have liquidity. The diluent can be terpineol. The stabilizer has strong polarity and can combine with the plasticizer to form a network structure or chain structure to enhance the viscosity and plasticity of the carbon nanotube cathode slurry. The stabilizer can be a polymer such as ethyl cellulose. The plasticizer is solvent with a molecular chain having strong polarized groups, and can combine with the stabilizer to form a network structure. The plasticizer can be dibutyl phthalate or dibutyl sebacate. In one embodiment, the plasticizer is dibutyl sebacate with a boiling point of about 344° C. The dibutyl sebacate is very volatilizable and inexpensive. The dibutyl sebacate does not contain a benzene ring and is environmentally safe. Furthermore, the organic carrier can include surfactant, such as Span 40 with a formula of $C_6H_8O(OH)_3OCO(CH_2)_{14}CH_3$ $C_{22}H_{42}O_6$ or Span 60 with a formula of $C_6H_8O(OH)_3OCO(CH_2)_{16}CH_3$ $C_{24}H_{46}O_6$.

In one embodiment, the organic carrier can be a photosensitive organic carrier including reactive diluents, oligomers and photoinitiators. The material of reactive diluents, oligomers and photoinitiators can be selected according to need. The oligomers and the reactive diluents have low evaporation rates and better thermal characteristics. The ratio of reactive diluents, oligomers and photoinitiator can be selected according to need. In one embodiment, the reactive diluent is Isobornyl methacrylate ester (IBOA) with a low curing shrinkage rate of about 8.2% to improve the adhesion; the oligomers is urethane acrylate oligomer (PUA) with a low curing shrinkage rate ranging from about 3% to about 5%; the photoinitiators is a mixture of benzophenone and 1-hydroxyethyl benzophenone ring (184). The weight percentage of the reactive diluent is about 35%, the weight percentage of oligomers is about 60%, and the weight percentage of photoinitiator is about 5%.

The first mixture, the second mixture and the organic carrier can be mixed to form the uniformly third mixture by ultrasonic vibrating or a three-roll roller mill.

In step (S14), the organic solvent can be removed by vaporizing with a heating device. While the organic solvent is being vaporized, the third mixture is gradually deposited and condensed to form the carbon nanotube slurry. It can be understood that when the inorganic binder content is too high, the viscosity of the carbon nanotube slurry will be too thick and the mobility of the carbon nanotube slurry is too poor, so the edges of the pattern formed during the subsequent application are irregular. When the inorganic binder content is too low, it will lead to poor plasticity of carbon nanotube slurry, thus the carbon nanotube slurry is not only easy to shape but also leads to a large number of holes existing in the pattern, the printing effect will be poor. The component proportion of carbon nanotubes slurry can be selected to ensure that the carbon nanotubes slurry can have a suitable viscosity and plasticity, in order to meet the requirements for field emission.

Figure 8:
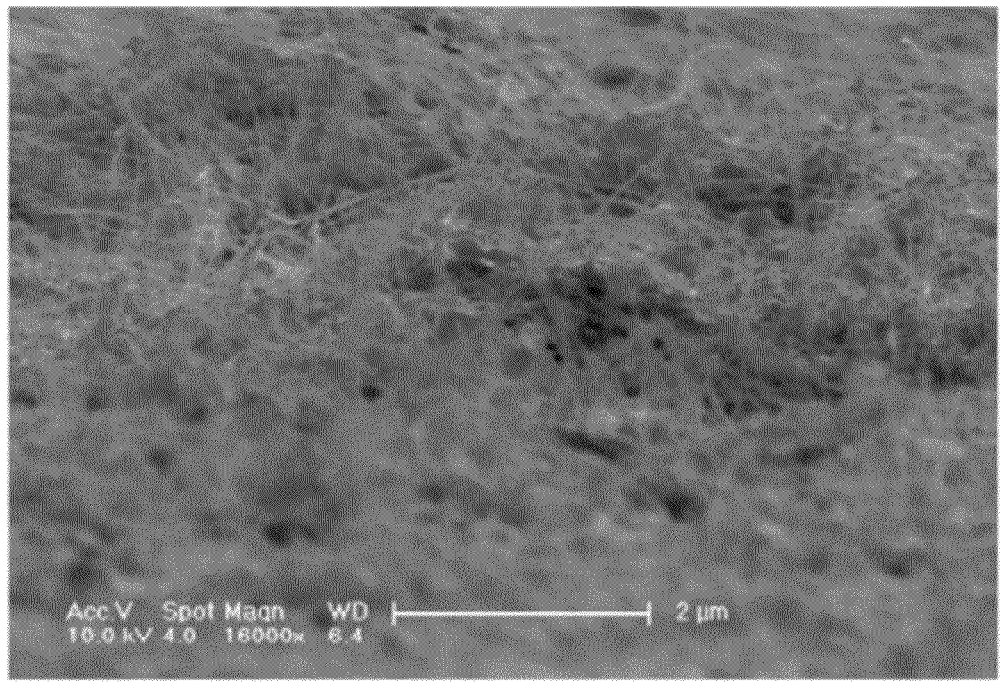
FIG. 8 shows a SEM image of carbon nanotube slurry in related art.
Figure 9:
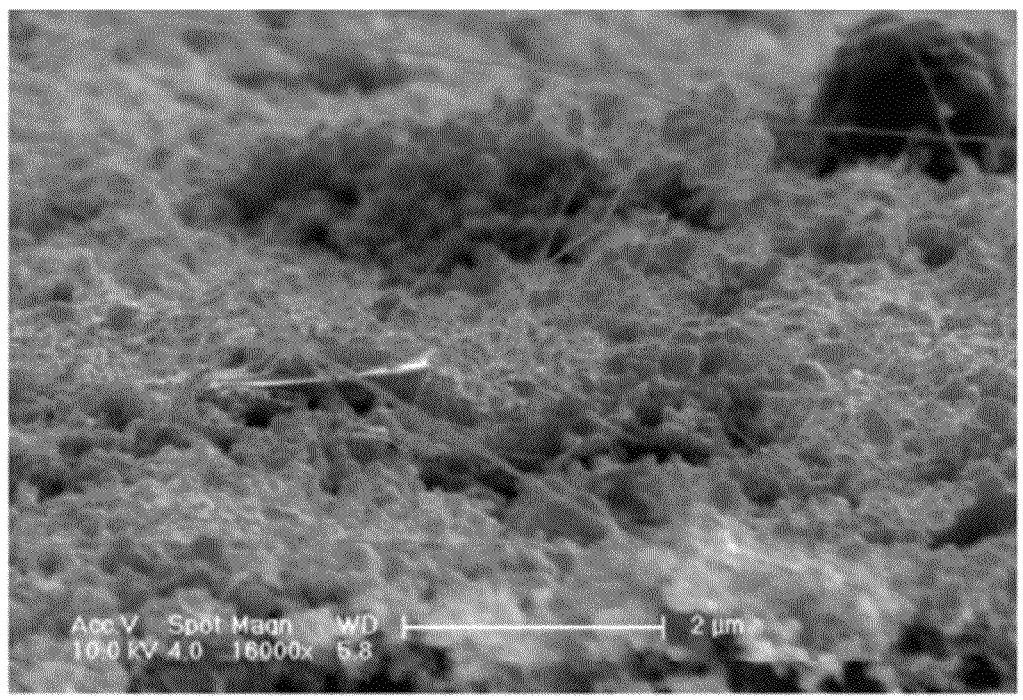
FIG. 9 shows a SEM image of one embodiment of carbon nanotube slurry.
Figure 10:
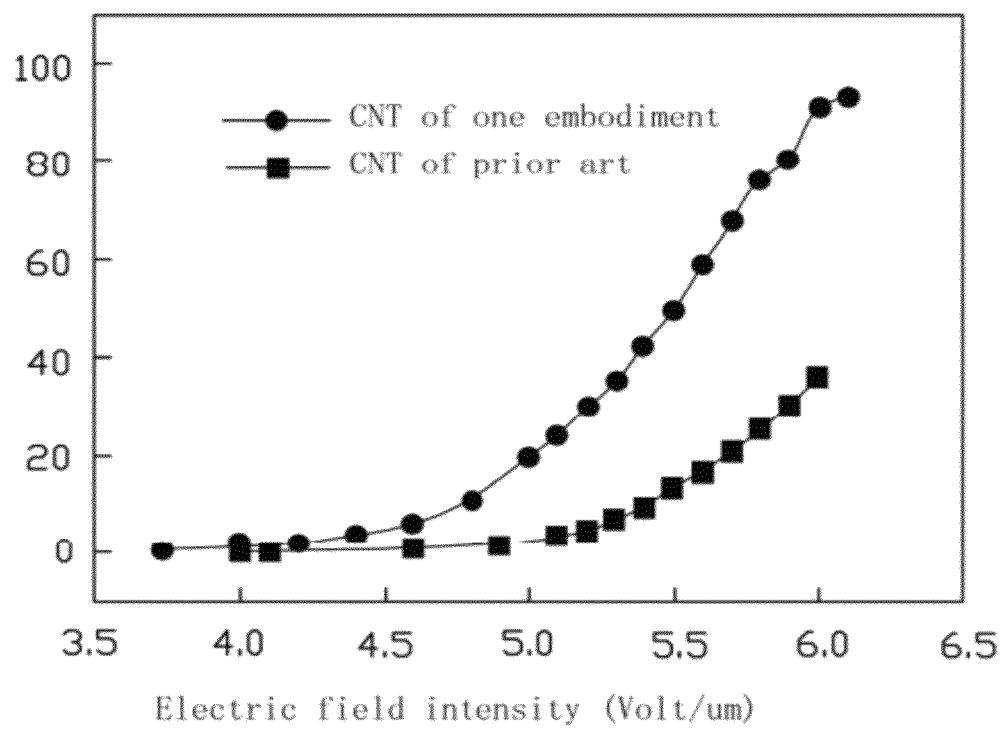
FIG. 10 shows a current density vs. electric field curve of carbon nanotube slurry of related art and a current density vs. electric field curve of carbon nanotube slurry of one embodiment.

Referring to FIG. 8, in the prior technology of carbon nanotube slurry, the length of the original carbon nanotubes will be in a range from about 100 micrometers to about 400 micrometers. Most of the original carbon nanotubes will be located fully within the carbon nanotube slurry. A few carbon nanotubes can be exposed from the surface of the carbon nanotube slurry. Furthermore, there is relatively strong shielding effect existing between the adjacent carbon nanotubes. Referring to FIG. 9 and FIG. 10, in one embodiment of the carbon nanotube slurry, the number of carbon nanotubes outcropping from the carbon nanotube slurry is relatively high, and the shield effect between the adjacent carbon nanotubes is relatively low. Thus the present carbon nanotube slurry can provide a higher field emission current density under the same macroscopic electric field.

The carbon nanotube slurry has following advantages. First, the carbon nanotube raw material is formed by laser cutting, and the laser spot is relatively small and has high stability, so the length of carbon nanotubes in the carbon nanotube raw material is substantially the same, so a uniform field emission current can be obtained during the filed emission. Second, as the carbon nanotube film is laid on a substrate, the carbon nanotube film can be firmly fixed on the surface of substrate, and the subsequent laser cutting process can be easily and precisely controlled to form the carbon nanotubes with same length. Third, the laser only plays the role of cutting the carbon nanotube film, thus the treatment time is short, and the efficiency is high, the method is convenient for mass production. Fourth, because the length of the carbon nanotubes in the carbon nanotube slurry is relatively short, when it is used as the coating for field emission, a plurality of carbon nanotubes can outcrop from the coating, a higher emission current density can be obtained. Fifth, because the carbon nanotubes have the substantially same length, the number of carbon nanotubes per unit area is relatively less, the shielding effect of field emission between adjacent carbon nanotubes is relatively weak, and a higher field emission current density can be obtained in the same macroscopic electric filed. Sixth, while a multi-layered carbon nanotube film can be set and cut to form the raw material, the product efficiency will be improved.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

What is claimed is:

1. A method for making carbon nanotube slurry, the method comprising:
   providing a carbon nanotube film, wherein the carbon nanotube film comprises a plurality of carbon nanotubes oriented along substantially a first direction;
   cutting the carbon nanotube film along a second direction to form at least one carbon nanotube belt, wherein the second direction is substantially perpendicular to the first direction, and the at least one carbon nanotube belt has a uniform width;
   mixing an inorganic binder, an organic carrier and the at least one carbon nanotube belt in an organic solvent to form a mixture;
   adding a filler in the mixture, wherein a weight percentage of the carbon nanotubes in the carbon nanotube slurry ranges from about 2% to about 5%, a weight percentage of the inorganic binder ranges from about 2% to about 5%, a weight percentage of the filler ranges from about 3% to about 6%, and a weight percentage of the organic carrier ranges from about 84% to about 93%; and removing the organic solvent from the mixture, wherein at least one carbon nanotube belt is formed by cutting the carbon nanotube by a laser having a power ranging from 1 watt to 100 watts.

2. The method of claim 1, wherein the at least one carbon nanotube belt comprises a plurality of carbon nanotubes having a substantially same length.

3. The method of claim 2, wherein the length of the plurality of carbon nanotubes in the at least one carbon nanotube belt ranges from about 5 micrometers to about 30 micrometers.

4. The method of claim 2, wherein the length of the plurality of carbon nanotubes in the at least one carbon nanotube belt ranges from about 10 micrometers to about 20 micrometers.

5. The method of claim 4, wherein a length difference between the longest carbon nanotube and the shortest carbon nanotube in the carbon nanotube belt is smaller than 5 micrometers.

6. The method of claim 1, wherein the carbon nanotube film is a freestanding structure and the plurality of carbon nanotubes in the carbon nanotube film is parallel to a surface of carbon nanotube film.

7. The method of claim 1, wherein the carbon nanotube film is drawn from a carbon nanotube array.

8. The method of claim 7, wherein the plurality of carbon nanotubes in the carbon nanotube film is joined end to end by van der Waals force.

9. The method of claim 1, wherein the carbon nanotube film is perpendicularly irradiated by the laser.

10. The method of claim 9, wherein a cutting speed of the laser ranges from about 5 mm/sec to about 200 mm/sec.

11. The method of claim 9, wherein cutting cycles of the laser range from about 1 time to about 10 times.

12. The method of claim 1, wherein the step of cutting the carbon nanotube film is executed under a pure oxide atmosphere.

13. The method of claim 1, wherein the inorganic binder is lead-free glass powder, a diameter of the glass powder ranges from about 2 micrometers to about 10 micrometers.

* * * * *